United States Patent
Kraiczyk et al.

[11] Patent Number: 6,039,601
[45] Date of Patent: Mar. 21, 2000

[54] CONTACT SPRING HAVING AN IMPROVED ELECTRICAL CONTACT

[75] Inventors: Josef Kraiczyk, Regensburg; Stephanus Mulders, Hagelstadt, both of Germany

[73] Assignee: Siemens Aktiengesellschaft, Munich, Germany

[21] Appl. No.: 09/036,651

[22] Filed: Mar. 6, 1998

[30] Foreign Application Priority Data

Mar. 6, 1997 [DE] Germany .......................... 197 09 188

[51] Int. Cl.⁷ .................................................. H01R 3/00
[52] U.S. Cl. .............................................. 439/500; 439/862
[58] Field of Search .................................. 439/560, 929, 439/862, 631

[56] References Cited

U.S. PATENT DOCUMENTS

| | | | |
|---|---|---|---|
| 3,778,753 | 12/1973 | Occhipinti et al. | 439/631 |
| 4,306,761 | 12/1981 | Ress, Jr. | 439/862 |
| 5,823,820 | 10/1998 | Patel et al. | 439/500 |

FOREIGN PATENT DOCUMENTS

| | | |
|---|---|---|
| 7327047 | 10/1973 | Germany . |
| 34 36 119C2 | 10/1986 | Germany . |
| 89 05 228 | 8/1989 | Germany . |
| 92 04 936 | 7/1992 | Germany . |
| 295 19 209 U1 | 4/1996 | Germany . |

*Primary Examiner*—Renee S. Luebke
*Assistant Examiner*—Javaid Nasri
*Attorney, Agent, or Firm*—Herbert L. Lerner; Laurence A. Greenberg; Werner H. Stemer

[57] ABSTRACT

A handheld transmitter has a housing in which there are disposed a printed circuit board and a battery. The circuit board and the battery are electrically connected by a contact spring. The contact spring has two preshaped spring arms each on its two ends, which are elastically braced against the printed circuit board and against the battery. The contact spring ensures that the battery and the printed circuit board are at all times securely connected electrically without being subject to disconnection caused by shaking the handheld transmitter.

7 Claims, 3 Drawing Sheets

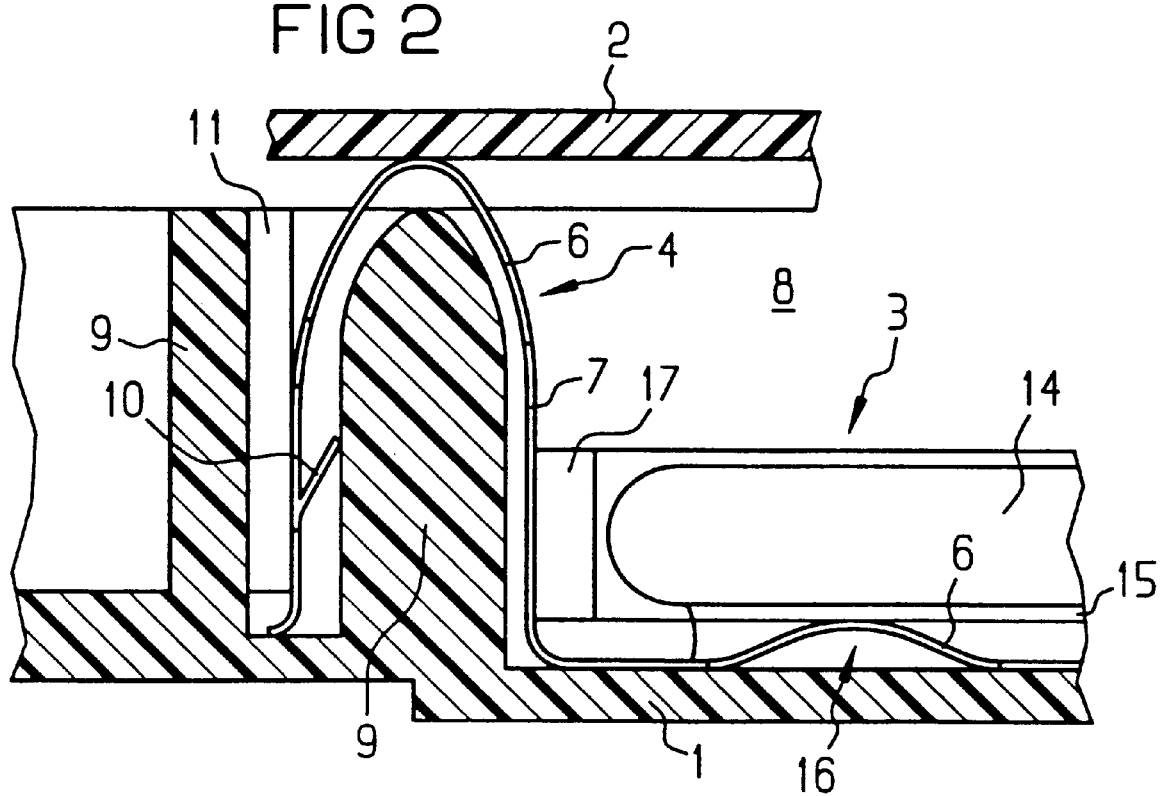

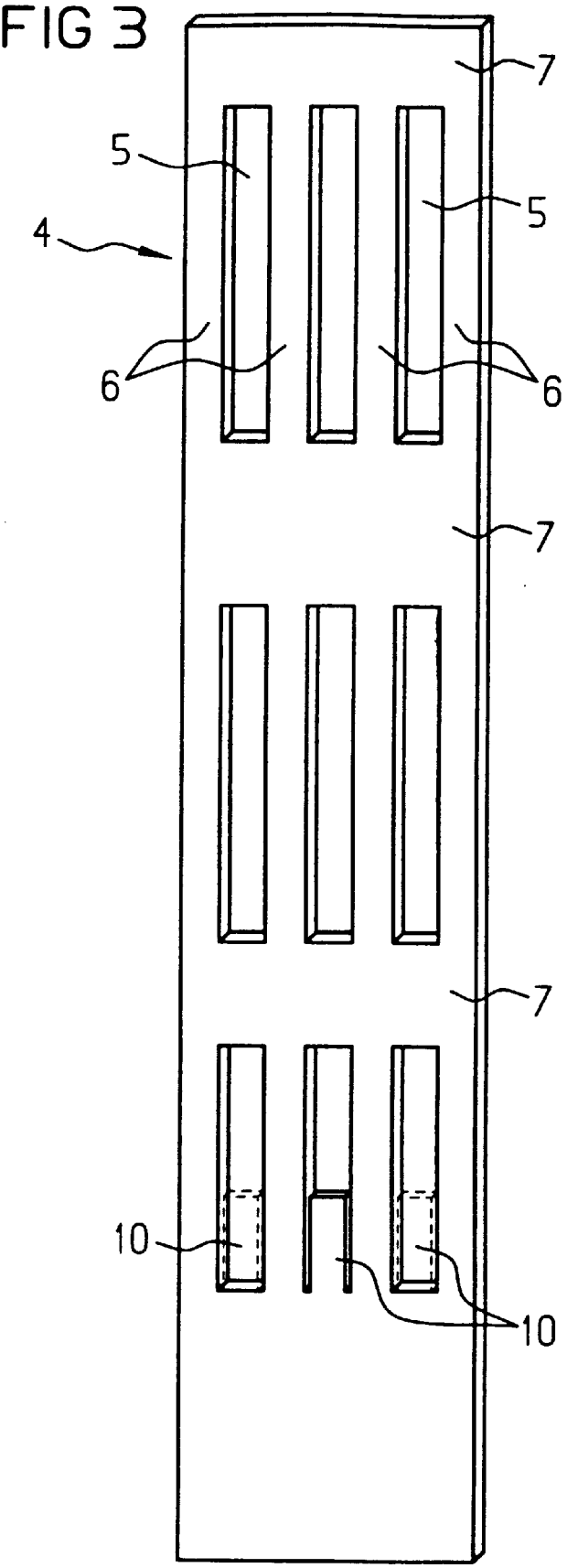

6,039,601

CONTACT SPRING HAVING AN IMPROVED ELECTRICAL CONTACT

BACKGROUND OF THE INVENTION

Field of the Invention

The invention relates to a portable electronic device, in particular a handheld transmitter for an anti-theft system of a motor vehicle.

A prior art device, described in European patent disclosure EP 0 267 429 B1, has a housing in which a printed circuit board is disposed. A circuit on the printed circuit board is supplied with energy by a battery, which is also disposed in the housing. To that end, a contact spring is provided, which on one end is disposed in a battery compartment and on the other is secured to the housing by means of rivets. The printed circuit board is placed on the contact spring in the region of the rivets. This results in an electrical connection between the battery and the printed circuit board.

The electrical connection between the printed circuit board and the contact spring is not secure enough because the connection is broken by shaking. On the other hand, securing the contact spring to the housing entails major assembly expense.

In another prior art electronic device, described in German Utility Model specification DE 92 04 936 U1, two electrical components are provided as well. A contact spring is provided that is bent in the shape of a U for electrically connecting the two components. Outward-pointing contact points that contact the first component are disposed along the curve. The second component is electrically contacted thereby, because the legs of the contact springs rest on the component with mechanical pressure.

SUMMARY OF THE INVENTION

It is accordingly an object of the invention to provide a portable electronic device, which overcomes the above-mentioned disadvantages of the heretofore-known devices and methods of this general type and in which a secure electrical connection, which can be disconnected, is established between two electrical components in a simple way.

With the foregoing and other objects in view there is provided, in accordance with the invention, a portable electronic device, such as a handheld transmitter for an anti-theft system of a motor vehicle, comprising:

a housing;

first and second electrical components disposed in the housing; and a contact spring electrically connecting the first and second electrical components to one another;

the contact spring having a plurality of holes formed therein and a plurality of spring arms defined between the holes, the contact spring being preshaped such that when the first and second electrical components are inserted in the housing, the contact spring is subjected to mechanical pressure by one of the electrical components causing at least two of the spring arms to rest with mechanical prestressing on the first electrical component, and at least two others of the spring arms to rest with mechanical prestressing on the second component.

In other words, the objects of the invention are satisfied in that the contact spring has a plurality of spring arms, which by mechanical pressure on the contact spring rest resiliently on one end on the first component and on the other on the second component. Closing the housing bends the contact spring, causing the contact spring to rest elastically against the components with mechanical pressure. As a consequence, a secure electrical connection is made which, nevertheless, can be easily disconnected.

In accordance with an added feature of the invention, the contact spring is a stamped and bent part made from spring sheet steel. The contact spring can thus be produced in most simple and inexpensive manufacture.

In accordance with an additional feature of the invention, the contact spring is integrally formed with a retaining element holding the contact spring in shake-proof position in the housing.

In accordance with another feature of the invention, the housing has housing walls and the contact spring is secured to the housing walls.

In accordance with a further feature of the invention, the first component is a printed circuit board, and the second component is a battery or a rechargeable battery.

Other features which are considered as characteristic for the invention are set forth in the appended claims.

Although the invention is illustrated and described herein as embodied in a portable electronic device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a similar view through a second exemplary embodiment of the device according to the invention;

FIG. 3 is a perspective front view of a contact spring of the device; and

DESCRIPTION OF THE PREFERRED EMBODIMENTS

Figure 1:
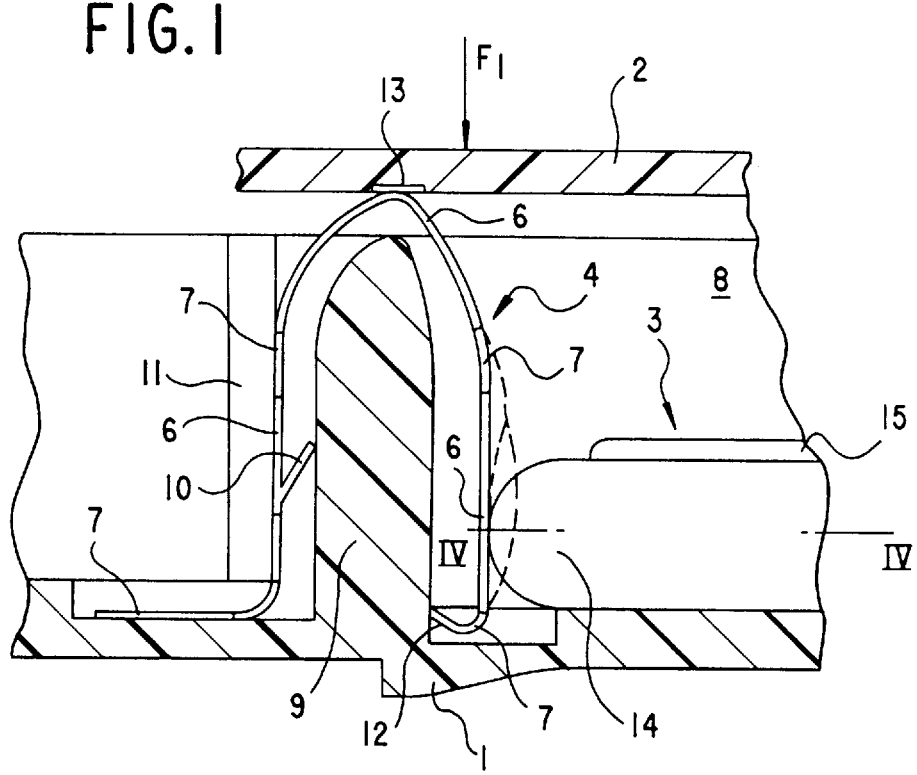
FIG. 1 is a partial sectional view taken through a first embodiment of the device according to the invention.
Figure 4:
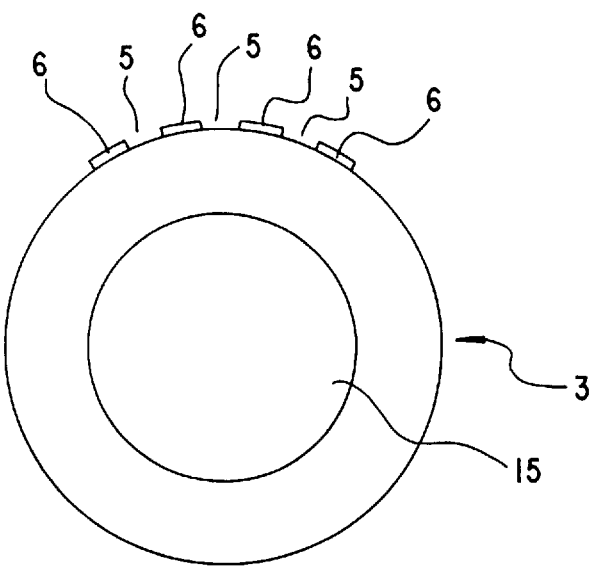
FIG. 4 is a partial cross-section along the line IV—IV in FIG. 1.

Referring now to the figures of the drawing in detail and first, particularly, to FIG. 1 thereof, the portable electronic device may, in particular, be a handheld transmitter for an anti-theft system for a motor vehicle. A housing 1 houses a first component, which is a printed circuit board 2 with an electrical/electronic circuit. The circuit is to be electrically connected to a second component. The second component is also disposed in the housing 1, but not in immediate contact with the printed circuit board 2.

The second component in the exemplary embodiments is a battery 3 in the form of a button cell, by which the circuit on the printed circuit board 2 is supplied with energy. It is understood that other components outside the printed circuit board 2 can also be connected electrically to the printed circuit board 2 in the manner according to the invention.

An electrical connection between the battery 3 and the circuit is established by an electrically conductive contact spring 4. The spring 4 is illustrated in FIG. 3 in a state in which it has not yet been shaped and/or mounted.

The contact spring 4 is made from a thin spring sheet steel. A plurality of groups of parallel slits 5 are stamped out from a strip of the spring sheet steel. This creates a plurality of groups of spring arms 6 disposed parallel to one another. For stabilization and to improve the torsional rigidity as well as for the sake of simple automatic assembly of the contact spring 4, ribs 7 of variable width remain between the groups of spring arms 6. Ribs 7 are advantageously also located on both ends of the contact spring 4. As a result, in the mounted state, the spring arms 6 can slip laterally out of place only with difficulty. The contact spring 4 is thereby intrinsically stabilized. This promotes the electrical contact security.

To enable the contact spring 4 to make an electrical connection between the battery 3 and the circuit on the printed circuit board 2, the contact spring is suitably preshaped as needed before being mounted.

The housing 1 has a tub or trough-shaped chamber 8, made integrally with it. One or more batteries 3 are disposed in the chamber 8. The chamber 8 is separated from the rest of the housing 1 by a housing wall 9. In the mounted state, the printed circuit board 2 covers the chamber 8.

Prior to covering the chamber 8 with the board 2, the preshaped contact spring 4 is inserted into the housing 1. In the exemplary embodiments of FIGS. 1 and 2, the contact spring 4 is bent in such a way that it is more or less wrapped around the housing wall 9 and that a portion thereof protrudes with into the chamber 8.

As indicated in phantom in FIG. 3 and to the left of the wall 9 in FIGS. 1 and 2, the contact spring 4 is formed with one or more retaining elements 10, which hold the contact spring 4 firmly in its position. To that end, each retaining element 10 is formed integrally with the contact spring 4. In the present exemplary embodiments, the retaining element 10 is a tab which is bent obliquely away from the contact spring 4.

Upon being mounted, the contact spring 4 is thrust into an interstice between the housing wall 9 and a stop 11. The interstice is narrow, so that the contact spring 4 can be guided well and retained in it. By means of the spring force of the tab 10, the contact spring 4 is clamped in place in this interstice. As a result, the contact spring 4 is secured in largely shake-proof fashion in its position on the housing 1.

Wih reference to FIG. 1, an end 12 of the contact spring 4 that is located in the chamber 8 is bent toward the housing wall 9, so that the contact spring 4 is braced against the housing wall 9. Because of the tab and the bent end 12, the contact spring 4 can no longer be displaced within the housing 1.

The contact spring 4 is preshaped in such a way that one group of spring arms 6 is located in the region of terminal faces 13 on the printed circuit board 2, and one group of spring arms 6 is located in the region of one terminal of the battery 3 (positive pole 14, negative pole 15). The contact spring 4 is preshaped in approximately a U or V toward the printed circuit board 2.

When the battery 3 is placed in the chamber 8, in the exemplary embodiment of FIG. 1, it first presses against at least one spring arm 6 of the contact spring 4. After that, the printed circuit board 2 is placed on the chamber 8 and on the contact spring 4. Because of the bearing force (see arrow $F_1$ in FIG. 1), the printed circuit board 2 presses from above onto the contact spring 4. This presses the electrical terminal faces 13 of the printed circuit board 2 against the spring arms 6, and as a result the spring arms 6 in the region of the printed circuit board 2 rest resiliently with mechanical bias (prestressing) on the printed circuit board 2.

Since the printed circuit board 2 presses against the contact spring 4, the entire contact spring 4 bulges elastically outward. In FIG. 1, the dashed line indicates the outer spring arm and the dotted line indicates the middle spring arm. However, the contact spring 4 cannot bulge outward between the housing wall 9 and the stop 11. In the region of the chamber 8, conversely, the contact spring 4—to the extent that the battery 3 allows it—can yield outward.

Since the spring arms 6 of the contact spring 4 are resilient, all the spring arms 6, as a reaction to the force $F_1$ upon bending in the region of the battery 3, press with mechanical pressure against the battery 3. Since the battery 3 shown here is circular in cross section, the spring arms 3 rest resiliently against the circumference of the battery 3 along the width of the contact spring 4.

Due to the fact that each group of spring arms 6 includes more than one spring arm 6, the contact spring 4 is electrically connected in each case at a plurality of contact points both to the battery 3 and to the printed circuit board 2 and hence to the circuit. As a result, a secure electrical connection is made between the battery 3 and the electronic circuit on the printed circuit board 2.

In the exemplary embodiment of FIG. 2, the contact spring 4 has a bulge 16 in the region of a terminal 14, 15 of the battery 3. The bulge 16 is a bend in a group of spring arms 6.

When the battery 3 is placed in the chamber 8, it rests on the bulge 16. As a result of this load, the battery 3 rests with pressure against the spring arms 6.

When the printed circuit board 2 is subsequently placed on the contact spring 4, the printed circuit board 2 presses against the contact spring 4, which is again elastically bent. However, in this embodiment, a stop 17 is provided in the chamber 8 which prevents the contact spring 4 at the housing wall 9 from bulging outward out of its position.

The contact spring 4 is therefore stressed only in the region of the bend at the printed circuit board 2. As a result, the spring arms 6 are mechanically prestressed. Thus a plurality of spring arms 6 rest resiliently with mechanical prestressing both on the printed circuit board 2 and on the battery 3. A secure electrical connection is therefore established between the battery 3 and the printed circuit board 2 via the contact spring 4.

The electrical terminals 13 of the printed circuit board 2 may be a single large-area terminal face or a plurality of smaller, parallel terminal faces. The terminal faces 13 are metallizations of the printed circuit board 2, which are connected to conductor tracks. When the contact spring 4 with its spring arms 6 contacts the terminal faces 13, an electrical connection is made between the two. It will be appreciated that, instead of the terminal faces 13, the conductor tracks may also be contacted directly by the spring arms 6.

The electrical terminals of the battery 3 shown in FIGS. 1 and 2 present a positive pole 14 and a negative pole 15. The metal body, for instance, may be the positive pole 14 and the disk cap is the negative pole 15. In FIG. 1, the spring arms 6 rest against the positive pole 14, and in FIG. 2 they rest on the negative pole 15.

In this contact spring 4, at least two spring arms 6 at a time are connected parallel to the printed circuit board 2 and at least two spring arms 6 are connected at the same time to the battery 3. Thus a proper electrical connection is ensured even if, because of dust or dirt at one connection or contact point, no electrical connection comes about. In the exemplary embodiment of FIG. 3, the contact spring 4 has four spring arms 6.

The preshaped contact spring 4 bent as a consequence of compressive force provides the advantage that at least two spring arms 6 rest with elastic pressure against the terminal faces 13, and two further spring arms 6 rest with elastic pressure against the battery 3.

The contact spring 4 is simple to produce and is simple to mount—in an automated assembly—in the device. If the contact spring 4 is suitably stamped out and durably preshaped, then it is simple to insert by machine into the housing 1.

The number of parallel spring arms 6 in each group is essentially immaterial for the invention. What is essential is that at least two spring arms 6 each be disposed along the contact spring 4, and at least two electrical contact points are created by each group. It is also important that the spring arms 6 are resilient and that after mounting, they press against both the printed circuit board 2 and the battery 3 by spring force (compression/prestressing).

It will be appreciated that the battery 3 pertains only to an exemplary embodiment of the preferred mode of the invention. Instead of the battery 3, still other electrical components may be employed within the scope of the concept of the invention, and via the contact spring 4 they are electrically connected to the circuit on the printed circuit board 2. Instead of the printed circuit board 2, other electrical components may also be used, such as relays, batteries, switches, etc., which place the contact spring 4 under pressure whenever they are inserted into the housing 1. Thus a secure electrical connection with the second electrical component is made.

The electronic device of the invention, in a current best mode, is a handheld transmitter for an anti-theft system (remote-controlling locking system, alarm system, or electronic immobilizer) of a motor vehicle. Upon actuation of a key, a code signal is sent to the motor vehicle, and in the vehicle the code is evaluated for authorization. To enable the handheld transmitter to generate the code signal, it requires electrical energy, which it receives from the battery 3. To allow replacement of the battery 3, the terminals of the battery 3 must not be connected permanently to the handheld transmitter.

Such a handheld transmitter can be easily mounted in automated assembly. All the parts (the assembled and soldered printed circuit board 2, battery 3, contact spring 4, entry keys) are first placed in the housing 1, and then the housing 1 is closed.

It is also possible for a plurality of contact springs to be disposed in the handheld transmitter. A first contact spring, for instance, electrically contacts the positive pole 14 of the battery, and a second contact spring contacts the negative pole 15 of the battery, thus establishing the necessary electrical connection to the printed circuit board. It is also possible to provide one or more contact springs 4 for each battery.

The housing 1, together with the housing walls 9 and the stops 11 and 17, may be produced integrally from plastic as an injection molded part.

An anti-theft system may be a remote-controlled locking system, an electronic immobilizer, or an access control system, which in each case has a portable electronic device (handheld transmitter) as a code signal transducer. Upon being actuated, the transducer sends a code signal to the motor vehicle as an aid in authentication. Once authentication has been successfully accomplished, the user is allowed to enter the vehicle and put the vehicle into operation. The code signal transducer may be disposed on a key grip of a mechanical key, or on a credit-card-sized "smart card".

We claim:

1. A portable electronic device, comprising:

a housing;

first and second electrical components disposed in said housing; and a contact spring electrically connecting said first and second electrical components to one another;

said contact spring having a plurality of mutually parallel, cutout slits formed therein and a plurality of spring arms defined between said slits, said contact spring being preshaped such that when said first and second electrical components are inserted in said housing, said contact spring is subjected to mechanical pressure by said first electrical component, said contact spring transferring at least a portion of the mechanical pressure to said second electrical component and causing at least two of said spring arms to rest with mechanical prestressing on said first electrical component, and at least two others of said spring arms to rest with mechanical prestressing on said second component.

2. The electronic device according to claim 1, wherein said contact spring is a stamped and bent part made from spring sheet steel.

3. The electronic device according to claim 1, wherein said contact spring is integrally formed with a retaining element holding said contact spring in shake-proof position in said housing.

4. The electronic device according to claim 1, wherein said housing has housing walls and said contact spring is secured to said housing walls.

5. The electronic device according to claim 1, wherein said first component is a printed circuit board, and said second component is a battery.

6. The electronic device according to claim 1, wherein said first component is a printed circuit board, and said second component is a rechargeable battery.

7. A handheld transmitter for an anti-theft system of a motor vehicle, comprising:

a housing;

an electronic component and a battery disposed in said housing; and a contact spring electrically connecting said electronic component to said battery;

said contact spring having a plurality of mutually parallel, cutout slits formed therein and a plurality of spring arms defined between said slits, said contact spring being preshaped such that when said electronic component and said battery are inserted in said housing, said contact spring is subjected to mechanical pressure, said contact spring transferring at least a portion of the mechanical pressure from said electronic component to said battery, and such that said electronic component causes at least two of said spring arms to brace with mechanical prestressing against said electronic component, and at least two others of said spring arms to brace with mechanical prestressing against said battery.

* * * * *